Feb. 24, 1931. E. H. YOUNG ET AL 1,793,890
FIGURE DEVICE
Filed Aug 19, 1929
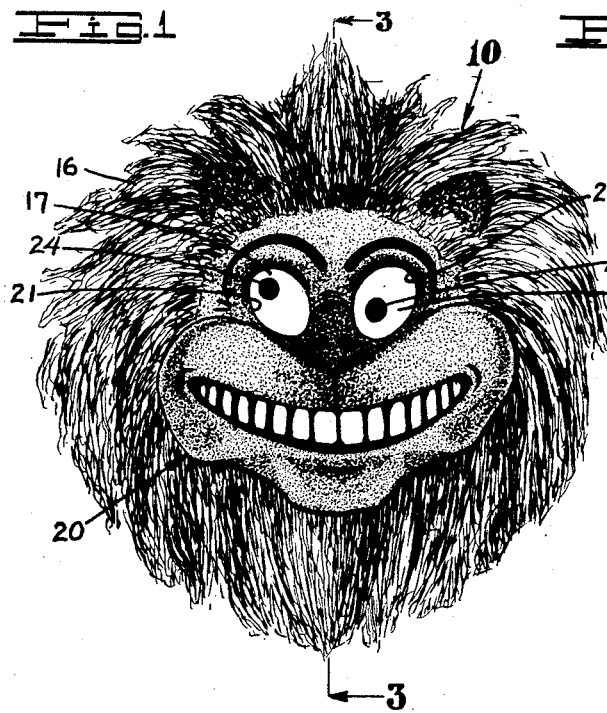
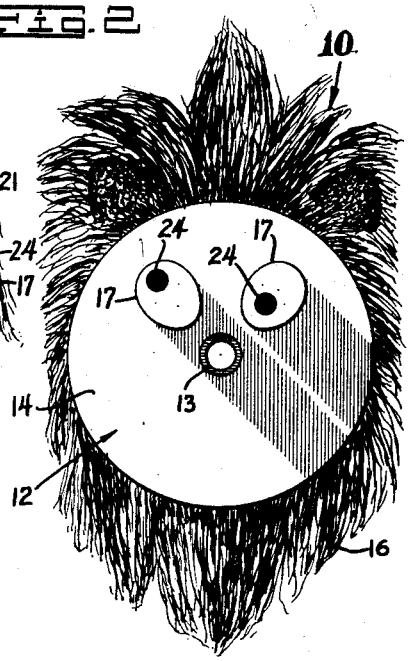
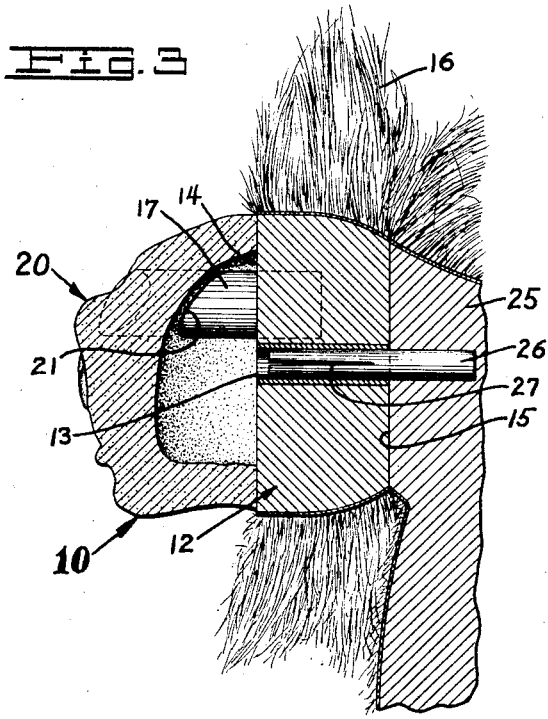
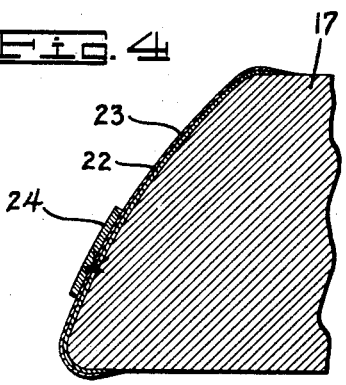
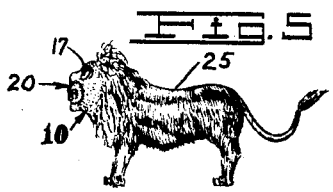
INVENTORS.
E. H. YOUNG
F. W. YOUNG.
BY
ATTORNEY.

Patented Feb. 24, 1931

1,793,890

UNITED STATES PATENT OFFICE

ELMER H. YOUNG AND FRANK W. YOUNG, OF LOS ANGELES, CALIFORNIA, ASSIGNORS TO KINEX STUDIOS, INC., OF LOS ANGELES, CALIFORNIA, A CORPORATION OF CALIFORNIA

FIGURE DEVICE

Application filed August 19, 1929. Serial No. 387,023.

This invention relates to figure devices.

The general object of the invention is to provide an improved figure device which is particularly adapted for use in the production of motion pictures.

A further object of the invention is to provide a figure device including a head which includes a base and a mask with novel means to hold the base and mask in assembled position.

Another object of the invention is to provide a figure device having thereon projecting members and having a facial portion coacting with the projecting members to center the facial portion.

A further object of the invention is to provide a figure device having eye portions and having novel means for holding the eyes adjustably in position.

Other objects and the advantages of this invention will be apparent from the following description taken in connection with the accompanying drawings wherein:

Fig. 1 is a front view of our improved figure device.

Fig. 2 is a view similar to Fig. 1 with the mask removed.

Fig. 3 is a section taken on line 3—3 of Fig. 1.

Fig. 4 is a fragmentary vertical longitudinal section through one of the eye pins and Fig. 5 is a side view of a figure of an animal embodying the features of our invention.

Referring to the drawings by reference characters we have indicated our improved head member generally at 10. In the accompanying drawings we have shown our device 10 as being made to simulate the head of a lion but it will be understood that it may be made to simulate various animals such as quadrupeds, bipeds, or reptiles, etc.

As shown the device 10 includes a base 12 having a central bushed aperture 13 therein and opposed front and rear surfaces 14 and 15. The outer periphery of the base 12 is shaped to coincide with the contour of the figure with which it is used and in a case like the present when the figure has hair or fur thereon such as the lion's mane, a fur skin or other suitable material is secured to the outer periphery of the base 12 as indicated at 16 in the drawings.

A pair of spaced dowel pins 17 are secured to the base 12 and project beyond the surface 15 thereof. These dowel pins 17 are so spaced and shaped that their outer ends represent the eyeballs of the animal.

A series of facial masks which are made to represent various expressions of the animal are provided and are adapted to be positioned on the base 12. We have indicated generally at 20 one of these facial masks. As shown the mask 20 includes, besides the various other facial features, a pair of apertures 21 which represent the eye sockets of the animal and are positioned so that they register with the pins 17 when the mask is in position on the base 12. The pins 17 thus serve to hold the mask 20 in position.

The ends of the pins 17 are provided with a coating of paint or enamel etc. 22, of the desired color and over the paint a coating or film of oil 23 is placed. The pupils of the eyes comprise thin disks of material 24 such as paper which are placed on the film of oil 23 as clearly shown in Fig. 4. The viscous qualities of the oil cause the disks 24 to adhere to the pins 17 and allows them to be freely moved thereon so that by moving the disks 24 various movements of the animals eyes may be produced without changing the mask.

As shown in Figs. 3 and 5 the animal in conjunction with which our device is shown as used, includes a body portion 25 having a dowel pin 26 thereon which is adapted to be positioned in the bushed aperture 13 of the base 12 when the device 10 is operatively positioned on the body. The base 12 is free to rotate about the axis of the pin 26 so that the entire head may be turned at various angles. The dowel preferably has a tight fit in the aperture 13 and the dowel may be slotted as at 27 to allow the base to turn and yet avoid accidental movement.

When our device 10 is used on a figure of an animal being photographed for motion picture use the camera is focused on the pins 17 and thereafter various masks may be positioned on the pins 17, the pupils 24 moved about or the entire head turned at various angles and the desired number of frames photographed without disturbing the relative position of the pins 17 to the camera so that the correct focus is maintained at all times.

From the foregoing description it will be apparent that we have provided a novel figure device which is simple in construction and highly efficient in use.

Having thus described our invention, we claim:

1. In a device of the class described, a base including spaced colored pins simulating eyeballs and a mask apertured to receive said pins, said pins having an oil film on the ends thereof and a disk engaging said film.

2. In a device of the class described, a head having portions thereon to simulate eyeballs, a free disk pupil positioned on each of said portions, and a film coating thereon to which said disk pupils adhere to retain said pupils on said portions while allowing free movement of said disk pupils thereon.

3. In a device of the class described, a head including a facial portion and having portions thereon to simulate eyeballs, a film of oil on said eyeball portions, and a disk positioned on each of said eyeball portions, said oil being adapted to retain said disks on said eyeball portions while allowing movement thereon.

4. In a device of the class described, a head having a facial part including portions made to simulate eyeballs, said eyeball portions being colored and having a film of oil thereon and a disk positioned on each portion.

5. In a device of the class described, a base having a pair of pins thereon, the free ends of said pins being shaped to simulate eyeballs and a mask having apertures positioned to represent eye sockets, said mask being received on and supported by said pins.

6. In a device of the class described, a base having a pair of pins thereon, the free ends of said pins being shaped to simulate eyeballs, a mask having apertures positioned to represent eye sockets and receiving said pins, the ends of said pins being colored and having a film of oil thereon and a disk positioned on the oil film on the free ends of each pin.

7. In a device of the class described, a body, a head for said body, said head including a base and a facial mask, a pair of pins on said base, the free ends of said pins being shaped and positioned to simulate eyeballs, a pair of apertures in said mask positioned to represent the eye sockets and receiving said pins, a coating of coloring on the ends of said pins, a film of oil thereon and a disk positioned on the free ends of said pins, said oil being adapted to retain said disks in place.

8. In a device of the class described, a support made to simulate the body portion of an animal, a pin on said support, a head member for said body portion, said head including a base and a facial mask, an aperture in said base, said support pin being positioned in said aperture, a pair of spaced pins on said base, the free ends of said pins being shaped and positioned to simulate the balls of the animal's eyes, a pair of apertures in said mask, said apertures being positioned to represent the eye sockets of said animal and receiving said pair of pins, a coating of coloring matter on the free ends of said pair of pins and a film of oil thereon, a disk positioned on the free ends of each of said pairs of pins, said oil being adapted to allow said disks to move while retaining them on the eyeball.

9. In a device of the class described, a member made to represent the rear portion of a part of the body portion of an animal and having projecting pins thereon, a second member made to represent the front portion of the same part of the body, said second member having apertures therein, said pins projecting into said apertures, said pins having a part visible and shaped to serve as a part of the representation of the animal.

In testimony whereof, we hereunto affix our signatures.

ELMER H. YOUNG.
FRANK W. YOUNG.